(12) United States Patent
Sadakuni et al.

(10) Patent No.: US 12,434,726 B2
(45) Date of Patent: Oct. 7, 2025

(54) VEHICLE DRIVING ASSISTANCE SYSTEM

(71) Applicant: TOYOTA JIDOSHA KABUSHIKI KAISHA, Toyota (JP)

(72) Inventors: Yudai Sadakuni, Toyota (JP); Masato Endo, Nagoya (JP); Yuko Hiratsuka, Toyota (JP); Akihito Nakamura, Toyota (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 18/222,536

(22) Filed: Jul. 17, 2023

(65) Prior Publication Data

US 2024/0025431 A1 Jan. 25, 2024

(30) Foreign Application Priority Data

Jul. 25, 2022 (JP) ................ 2022-117716

(51) Int. Cl.
*B60W 50/08* (2020.01)
*B60K 35/231* (2024.01)
*B60W 50/02* (2012.01)
*B60W 50/10* (2012.01)
*B60W 50/14* (2020.01)

(52) U.S. Cl.
CPC ......... *B60W 50/085* (2013.01); *B60K 35/231* (2024.01); *B60W 50/0205* (2013.01); *B60W 50/10* (2013.01); *B60W 50/14* (2013.01); *B60W 2050/146* (2013.01)

(58) Field of Classification Search
CPC .......... B60W 50/085; B60W 50/0205; B60W 50/10; B60W 50/14; B60W 2050/146
See application file for complete search history.

(56) References Cited

U.S. PATENT DOCUMENTS

| | | | |
|---|---|---|---|
| 2018/0105185 A1* | 4/2018 | Watanabe | B60W 50/14 |
| 2022/0371580 A1* | 11/2022 | Kusumoto | B60W 10/20 |
| 2023/0406341 A1* | 12/2023 | Satre | G08G 1/167 |
| 2024/0000354 A1* | 1/2024 | Kunieda | G08G 1/00 |
| 2024/0270267 A1* | 8/2024 | Miyamichi | G07C 5/00 |
| 2025/0010719 A1* | 1/2025 | Yahata | B60K 35/28 |

FOREIGN PATENT DOCUMENTS

JP 2021-072064 A 5/2021

* cited by examiner

*Primary Examiner* — Wade Miles
*Assistant Examiner* — Jerrod Irvin Davis
(74) *Attorney, Agent, or Firm* — Dinsmore & Shohl LLP

(57) ABSTRACT

When there is a new driving assistance function for a registered driver, which is a driving assistance function enabled for the first time for the relevant registered driver among a plurality of driving assistance functions to be enabled for registered drivers, a test executor executes a driving ability test according to the new driving assistance function for the relevant registered driver. A personalization setter determines recommended setting values of the new driving assistance function based on the result of the driving ability test.

4 Claims, 9 Drawing Sheets

| DRIVER ID | ****** | | |
|---|---|---|---|
| DRIVING ASSISTANCE FUNCTION | SETTING | SETTING VALUE | |
| LANE TRACING ASSIST | ENABLED | ALERT TIMING | ASSISTING TIMING |
| | | ** m AHEAD | ** m AHEAD |
| ADAPTIVE CRUISE CONTROL | ENABLED | DISTANCE BETWEEN VEHICLES | SET VEHICLE SPEED |
| | | ** m | ** km/h |
| PROACTIVE DRIVING ASSIST | ENABLED | ALERT TIMING | ASSISTING TIMING |
| | | ** m AHEAD | ** m AHEAD |
| PRECRASH SAFETY | ENABLED | ALERT TIMING | ASSISTING TIMING |
| | | ** m AHEAD | ** m AHEAD |
| ROAD SIGN ASSIST | ENABLED | EXCEEDING SPEED LIMIT | NO ENTRY |
| | | NOTICE DISPLAY & BUZZER | NOTICE DISPLAY ONLY |
| ⋮ | ⋮ | ⋮ | ⋮ |

| DRIVER ID | * * * * * * | | |
|---|---|---|---|
| DRIVING ASSISTANCE FUNCTION | SETTING | SETTING VALUE | |
| LANE TRACING ASSIST | ENABLED | ALERT TIMING | ASSISTING TIMING |
| | | ** m AHEAD | ** m AHEAD |
| ADAPTIVE CRUISE CONTROL | ENABLED | DISTANCE BETWEEN VEHICLES | SET VEHICLE SPEED |
| | | ** m | ** km/h |
| PROACTIVE DRIVING ASSIST | ENABLED | ALERT TIMING | ASSISTING TIMING |
| | | ** m AHEAD | ** m AHEAD |
| PRECRASH SAFETY | ENABLED | ALERT TIMING | ASSISTING TIMING |
| | | ** m AHEAD | ** m AHEAD |
| ROAD SIGN ASSIST | ENABLED | EXCEEDING SPEED LIMIT | NO ENTRY |
| | | NOTICE DISPLAY & BUZZER | NOTICE DISPLAY ONLY |
| ... | ... | ... | ... |

FIG. 6

VEHICLE DRIVING ASSISTANCE SYSTEM

CROSS REFERENCE TO RELATED APPLICATION

This application claims priority to Japanese Patent Application No. 2022-117716, filed on Jul. 25, 2022, which is incorporated herein by reference in its entirety including the specification, claims, drawings, and abstract.

TECHNICAL FIELD

The present disclosure relates to a vehicle driving assistance system.

BACKGROUND

Vehicle driving assistance systems for drivers have been known. For example, a system for diagnosing the cognitive function of elderly drivers is disclosed in JP 2021-72064 A. In this system, various questions are asked to the driver through a speaker. The system is also equipped with a microphone to collect oral responses from the driver. The system then evaluates the cognitive function of the driver based on the percentage of correct answers to the questions.

The present specification discloses a vehicle driving assistance system capable of setting various setting values of driving assistance items appropriately according to the driving ability of the driver.

SUMMARY

A vehicle driving assistance system disclosed herein includes a register, a setter, and a test executor. The register can register driver information. The setter can change the enable/disable setting of a plurality of driving assistance functions and change setting values of the plurality of driving assistance functions for registered drivers who are registered in the register. When there is a new driving assistance function for a specific registered driver, which is a driving assistance function enabled for the first time for the relevant registered driver among the plurality of driving assistance functions to be enabled for the registered drivers, the test executor executes a driving ability test according to the new driving assistance function for the relevant registered driver. Then, the setter determines recommended setting values of the new driving assistance function based on the result of the driving ability test.

In the above structure, so-called personalization is performed, in which whether to enable or disable the driving assistance functions is set and the setting values of the driving assistance functions for each registered driver are set. In setting the setting values of the new driving assistance function for which no history data exist for a specific registered driver, the personalization can set the setting values according to the relevant registered driver based on the result of the driving ability test.

In the above structure, the setter may output a guidance message to the registered driver requesting whether to set the recommended setting values. In this case, the vehicle driving assistance system includes a service provider that provides an additional service when an input operation is performed to agree to the setting of the recommended setting values.

In the above structure, the driving assistance functions suitable for the registered driver can be provided by setting the values according to the recommended values. The execution of the driving assistance functions suitable for the registered driver reduces the accident and failure rate of the vehicle. The provider of the additional services can achieve benefits, such as improved vehicle reliability, that exceed the cost of providing the additional services.

In the above structure, the vehicle driving assistance system may include a projector and an input device. The projector can project images onto a windshield glass of the vehicle. The input device receives input operations from the registered driver. The new driving assistance function is a pedestrian avoidance function. The test executor projects a person image from the projector to the side portion of the windshield glass and outputs a message requesting an input operation to the input device when the person image is recognized. Subsequently, the test executor determines recommended setting values of the new driving assistance function based on elapsed time from the time when the person image is projected to the time when the input operation to the input device is performed.

In the above structure, when executing the pedestrian avoidance driving assistance function, it is possible to examine in advance how pedestrians are seen from the driver's seat of the vehicle where the registered driver is actually driving.

In the above structure, the vehicle driving assistance system may include a projector and an input device. The projector can project images onto the windshield glass of the vehicle. The input device receives input operations from the registered driver. The new driving assistance function is a vehicle avoidance function. The test executor projects a vehicle image from the projector to the center portion of the windshield glass and outputs a message requesting an input operation to the input device when the vehicle image is recognized. The test executor determines recommended setting values of the new driving assistance function based on elapsed time from the time when the vehicle image is projected to the time when the input operation to the input device is performed.

In the above structure, when executing the vehicle avoidance driving assistance function, it is possible to examine in advance how vehicles are seen from the driver's seat of the vehicle where the registered driver is actually driving.

According to the vehicle driving assistance system described herein, various setting values of driving assistance items can be set appropriately according to the driving ability of the driver.

BRIEF DESCRIPTION OF DRAWINGS

FIG. 6 illustrates a personalization table;

DESCRIPTION OF EMBODIMENTS

Overall Structure

Figure 1:
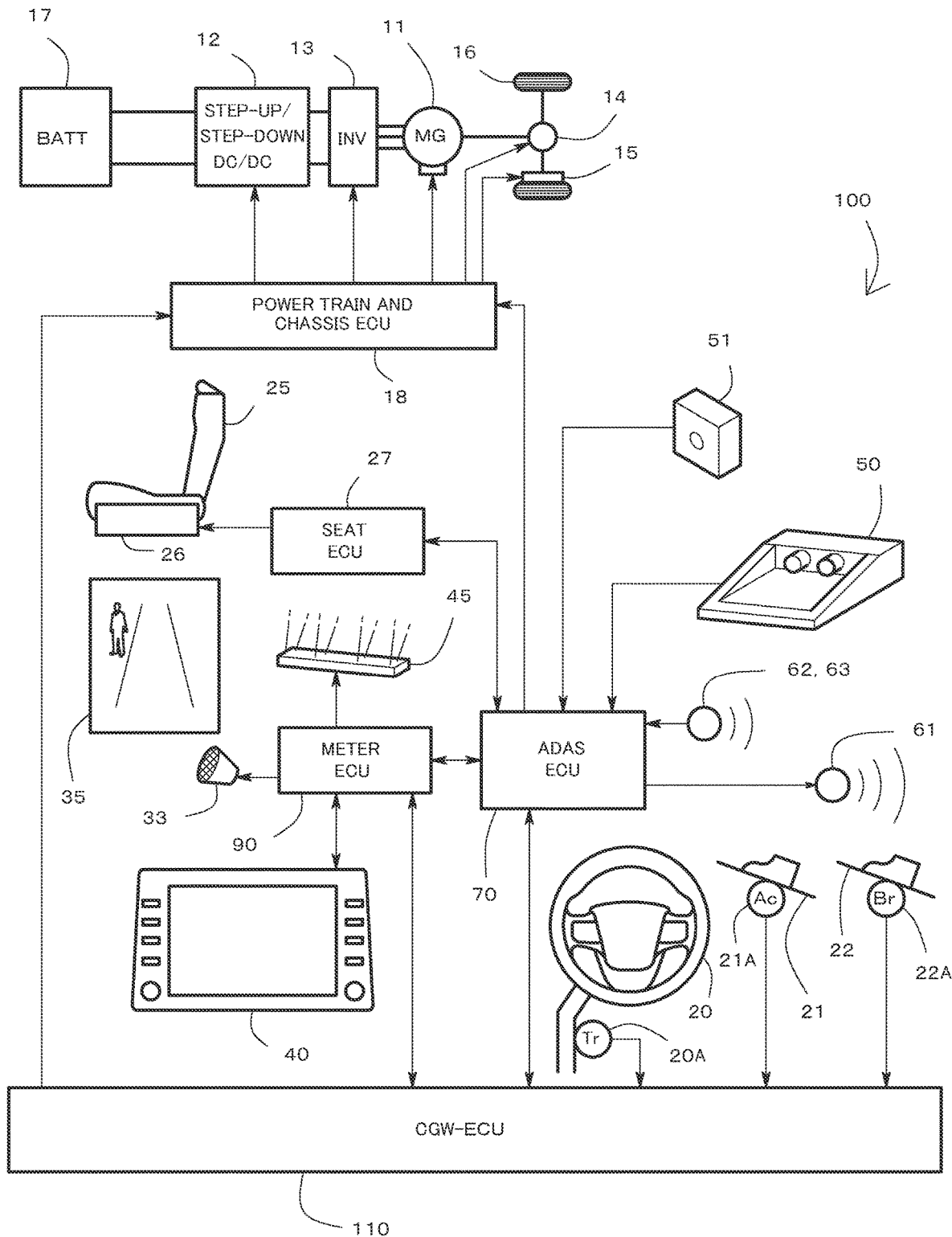
FIG. 1 illustrates a hardware structure of a vehicle driving assistance system according to an embodiment.

FIG. 1 illustrates an overall structure of a vehicle 100 including a driving assistance system according to an embodiment. FIG. 1 mainly illustrates devices related to the driving assistance functions of the vehicle 100, and other devices that have little relevance to such functions are omitted from the drawing as appropriate.

The vehicle 100 may be, for example, a battery electric vehicle (BEV) equipped with a rotating electrical machine 11 as a drive source. The vehicle 100 may also be a hybrid electric vehicle (HEV) or a plug-in hybrid electric vehicle (PHEV). As described in detail below, the vehicle driving assistance system of the present embodiment also includes a center display 40, a head-up display projector (hereinafter will be referred to as an HUD projector) 45, an advanced driver assistance system (ADAS)-electronic control unit (ECU) 70, and a meter ECU 90.

Various driving assistance functions are implemented in the vehicle 100. The driving assistance functions can be broadly classified into convenience functions and safety functions. Convenience functions, such as adaptive cruise control (ACC), are designed to reduce the burden of driving operations. Safety functions, such as lane tracing assist (LTA), are designed to avoid or minimize vehicle accidents and reduce the scale of accidents. The details of these functions will be described later.

The vehicle driving assistance system of the present embodiment includes a so-called personalization function that allows the driving assistance functions to be set for individual drivers. In the personalization, it is possible to select enable/disable settings, such as which function to enable among a plurality of driving assistance functions. In addition, the personalization function allows the setting values of the enabled driving assistance functions to be set for each driver.

In one example, the adaptive cruise control is enabled and the lane tracing assist is disabled for a certain driver. In addition, a distance between vehicles is set to an arbitrary value (long, middle, or short) as the setting value of the enabled adaptive cruise control function.

For such setting values of the driving assistance functions, according to the vehicle driving system of the present embodiment, the ADAS-ECU 70, for example, provides recommended values to assist the input work by the driver. For example, when the personalization function is activated and the driver selects a driving assistance function to be enabled, the ADAS-ECU 70 provides recommended setting values.

In determining the recommended setting values, a driving history, for example, of the driver is referenced. For example, when a certain driving assistance function is enabled, the recommended setting values are determined based on the number of times the function has actually been executed.

Furthermore, in determining the recommended setting values, the ADAS-ECU 70 executes a driving ability test for the driver when there is a new driving assistance function among the driving assistance functions to be enabled during the personalization setting. The new driving assistance function refers to a driving assistance function that is enabled for the first time (i.e., when there is no driving history) for the driver who is entering settings. The ADAS-ECU 70 determines the recommended setting values of the new driving assistance function based on the result of the driving ability test. The details of the driving ability test will be described later.

Drive System Device

For example, the vehicle 100 includes a battery 17, a step-up/step-down DC/DC converter 12, an inverter 13, and a rotating electrical machine 11 as a high-voltage circuit of the drive system. The DC power output from the battery 17 is boosted, for example, by the step-up/step-down DC/DC converter 12, and then converted orthogonally by the inverter 13. The converted AC power is supplied to the rotating electrical machine 11 to drive it. This driving force is transmitted to drive wheels 16 through a steering mechanism 14. The drive wheels 16 are also provided with a brake mechanism 15.

The vehicle 100 also includes a steering wheel 20, an accelerator pedal 21, and a brake pedal 22 as the mechanism for manual operation. Sensors 20A to 22A are provided for these devices, and the amount of operation of these devices by the driver is sent, for example, as an electrical signal from the sensors 20A to 22A to a central gateway ECU 110 (hereinafter will be referred to as CGW-ECU). In response, the CGW-ECU 110 sends drive, braking, and steering commands to a powertrain and chassis ECU 18.

Furthermore, the powertrain and chassis ECU 18 sends switching signals to the inverter 13 in response to the drive commands. The powertrain and chassis ECU 18 also sends drive signals to the motor of the brake mechanism 15 in response to braking commands. Furthermore, the powertrain and chassis ECU 18 sends drive signals in response to steering commands to the steering motor of the steering mechanism 14.

Sensor

FIG. 1 illustrates sensors used for implementing the driving assistance functions for the vehicle 100. As sensors for the steering system, the vehicle 100 is provided with a torque sensor 20A, an accelerator position sensor 21A, and a brake position sensor 22A.

As sensors for recognizing the situation outside the vehicle, the vehicle 100 includes an exterior camera unit 50, a lidar sensor 61, and radar sensors 62 and 63.

Figure 2:
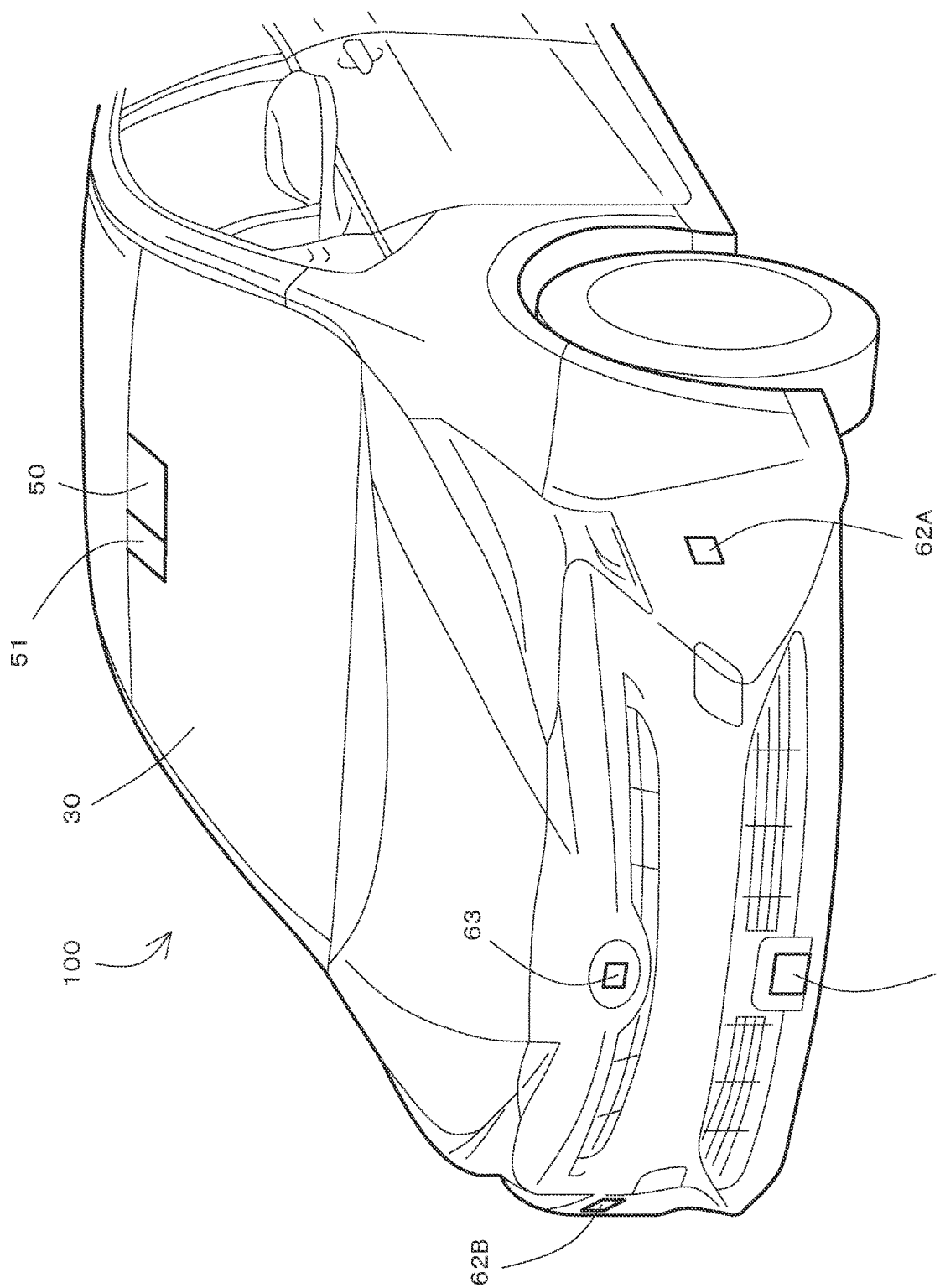
FIG. 2 illustrates various sensors mounted in the front part of a vehicle.

FIG. 2 illustrates the front portion of the vehicle 100. The front center radar sensor 63 is provided on the front surface of the vehicle 100, for example, behind an emblem which is placed in the center part in the vehicle width direction. The front side radar sensors 62A and 62B are provided on respective sides of the front surface of the vehicle 100. All of these radar sensors, for example, are composed of millimeter wave radars.

In addition, the lidar sensor 61 is provided on the front surface of the vehicle 100, for example, in the center part in the vehicle width direction and below the license plate mounting position. The lidar sensor 61 uses light detection and ranging (LiDAR), a technology that uses laser light (e.g., infrared light) to measure a distance to surrounding objects. The lidar sensor 61 is a solid-state unit, for example. The lidar sensor 61 scans using a laser beam planarly toward the front of the vehicle 100 to acquire 3D point cloud data in front of the vehicle 100.

Figure 3:
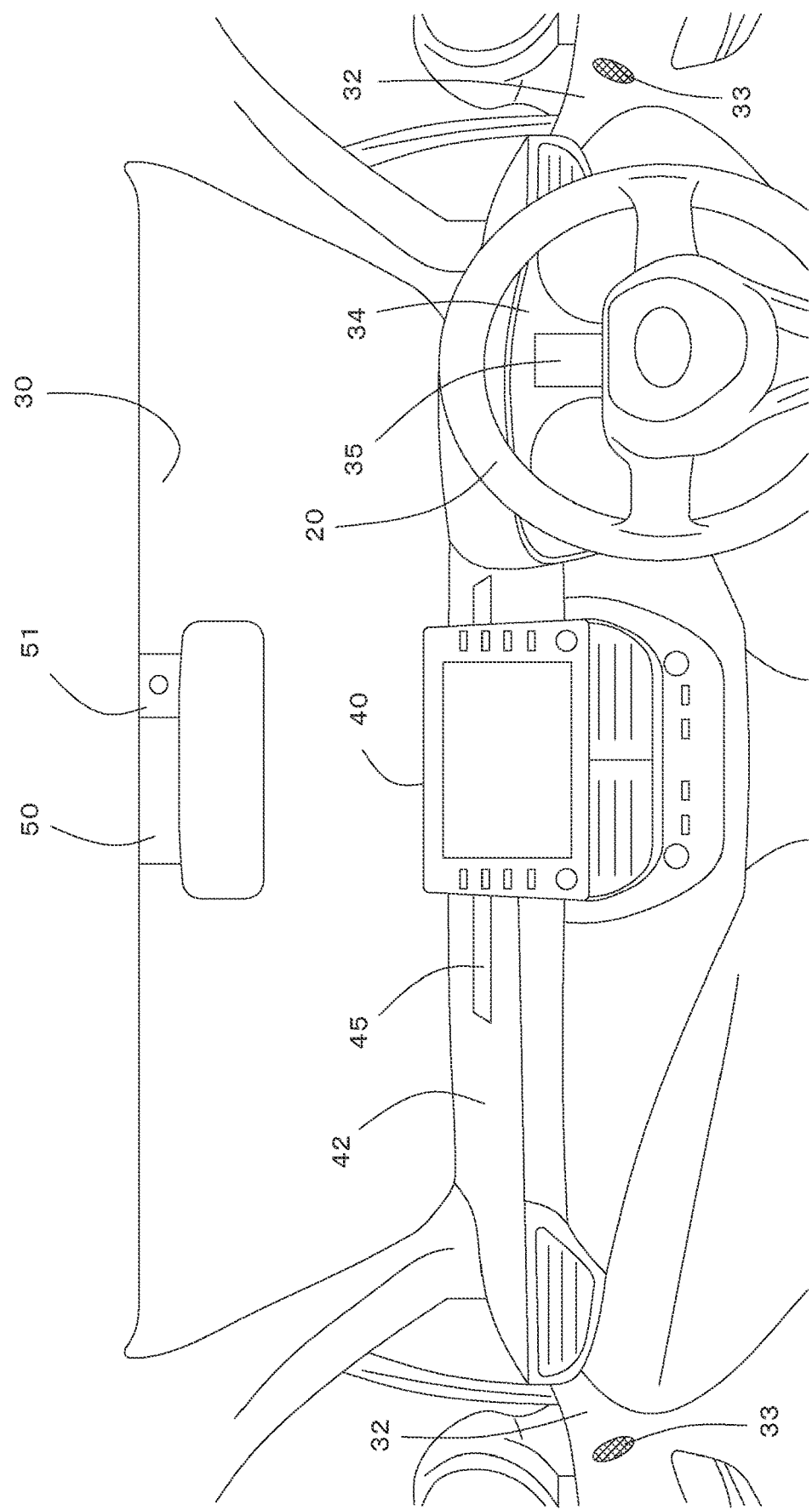
FIG. 3 illustrates the front part of a vehicle cabin.

Referring to FIGS. 2 and 3, the exterior camera unit 50 and an interior camera 51 are provided on the back surface of a windshield glass 30; that is, the surface exposed to the vehicle cabin. The exterior camera unit 50 and the interior camera 51 are provided, for example, in the upper center part of the windshield glass 30 in the width direction.

The exterior camera unit 50 is a stereo camera unit composed of, for example, two cameras, and is capable of capturing images of the front of the vehicle through the windshield glass 30.

The interior camera 51 is, for example, a monocular camera capable of capturing an image of the face, for example, of the driver in the vehicle cabin.

Video and Audio System Device

FIG. 3 illustrates an example of the front part of a vehicle cabin. An instrument panel 42 is equipped with the center display 40, the HUD projector 45, and a meter display 35.

The center display 40 is, for example, a touch panel display in which input and output sections are integrated. The center display 40 is erected, for example, on the top surface of the instrument panel 42 in the center of the vehicle width direction.

The center display 40 displays various information on the vehicle 100. For example, when personalizing the driving assistance functions, which will be described later, a screen for selecting the enable/disable settings of the various driving assistance functions is displayed on the center display 40.

In the enabled (turned on) driving assistance functions, when there is a new driving assistance function that is enabled for the first time for a driver (registered driver) who is in the personalization setting process, a driving ability test image is displayed on the center display 40. Details of the driving ability test will be described later.

The meter display 35 is provided in a meter panel 34. The meter display 35 is placed, for example, in front of the steering wheel 20. For example, the meter display 35 displays alert messages for the driving assistance functions.

The HUD projector 45 projects an image onto the windshield glass 30. For example, the HUD projector 45 can project an image over the entire width of the windshield glass 30.

The HUD projector 45 projects, for example, an alert image when the driving assistance function is activated. For example, a highlight image is superimposed on the lane from which the vehicle is about to deviate. Alternatively, in the execution of the driving ability test, the HUD projector 45 also projects onto the windshield glass 30 a vehicle image 120 (see FIG. 8) representing a vehicle running in front of the own vehicle, or a person image 125 (see FIG. 9) representing a person walking on the side of the roadway.

The vehicle cabin is also provided with speakers 33 as the audio system device. For example, the speakers 33 are provided in upper front portions of a pair of front doors 32, 32. The speakers 33 are so-called tweeters, for example, that output sound in a high frequency range. Output surfaces of the speakers 33 are directed respectively toward the driver and a front passenger.

ECU

As illustrated in FIG. 1, a plurality of ECUs are provided in the vehicle 100. These ECUs are provided, for example, for different functions of the vehicle 100. For example, the vehicle 100 includes the powertrain and chassis ECU 18, a seat ECU 27, the ADAS-ECU 70, and the meter ECU 90.

Furthermore, the central gateway ECU 110 (CGW-ECU) is provided in the vehicle 100 as an upper ECU that integrates these function-specific ECUs. The CGW-ECU 110, for example, heads the function-specific ECUs to perform cooperative control in which a plurality of function-specific ECUs cooperate to execute a single function. The CGW-ECU 110 is also signal-connected to the torque sensor 20A, the accelerator position sensor 21A, and the brake position sensor 22A, which are sensors that detect the amount of operation of the vehicle 100 by the driver.

The powertrain and chassis ECU 18, the seat ECU 27, the ADAS-ECU 70, and the meter ECU 90 can communicate with each other via the CGW-ECU 110. Alternatively, the ADAS-ECU 70 can communicate with, for example, the powertrain and chassis ECU 18, the seat ECU 27, and the meter ECU 90 without going through the CGW-ECU 110. The respective ECUs are connected by signal lines in accordance with a controller area network (CAN) standard or the like.

The powertrain and chassis ECU 18 controls the rotating electrical machine 11, the steering mechanism 14, and the brake mechanism 15. The seat ECU 27 controls a seat adjuster 26. The seat adjuster 26 is equipped with a number of electric actuators to adjust positions of a driver's seat 25 and a front passenger seat (not illustrated), the height of the seat cushion for each seat, and the tilt angle of the seat back for each seat. The meter ECU 90 performs display control and audio control of the HUD projector 45, the speakers 33, the meter display 35, and the center display 40.

The ADAS-ECU 70 is an ECU for the advance drive-assistance systems. The ADAS-ECU 70 is signal-connected to the exterior camera unit 50, the interior camera 51, the lidar sensor 61, and the radar sensors 62 and 63, which are sensors for recognizing the situation outside the vehicle.

Figure 4:
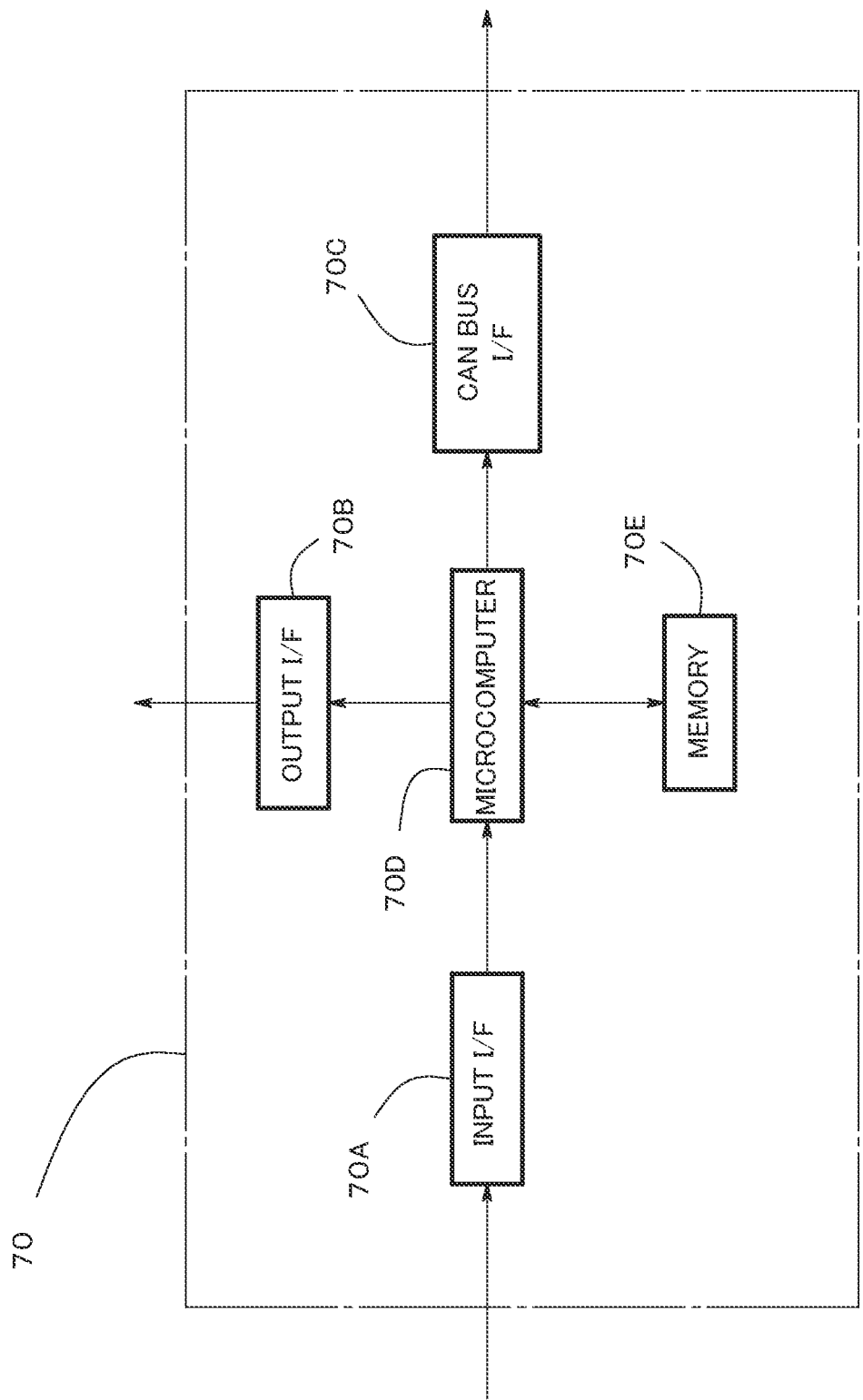
FIG. 4 illustrates a hardware structure of an ECU.

Both the function-specific ECUs and the CGW-ECU 110 described above are composed of electronic devices as illustrated in FIG. 4. The hardware structure of the ADAS-ECU 70 is illustrated in FIG. 4. The ADAS-ECU 70 (or other ECUs) includes an input I/F 70A, an output I/F 70B, a CAN bus I/F 70C, a microcomputer 70D, and a memory 70E.

The CAN bus I/F 70C is a device for connecting the ADAS-ECU 70 to other ECUs. The input I/F 70A is a connection device for the ADAS-ECU 70 to receive signals from in-vehicle sensor devices such as the exterior camera unit 50. The output I/F 70B is a connection device for sending signals from the ADAS-ECU 70 to devices other than the ECUs.

The microcomputer 70D executes various controls and calculations according to a given program. For example, the microcomputer 70D is composed of a central processing unit (CPU), a memory, and peripheral devices such as an input/output device. In addition, the memory 70E, which is a storage device such as a solid state drive (SSD), is connected to the microcomputer 70D.

Figure 5:
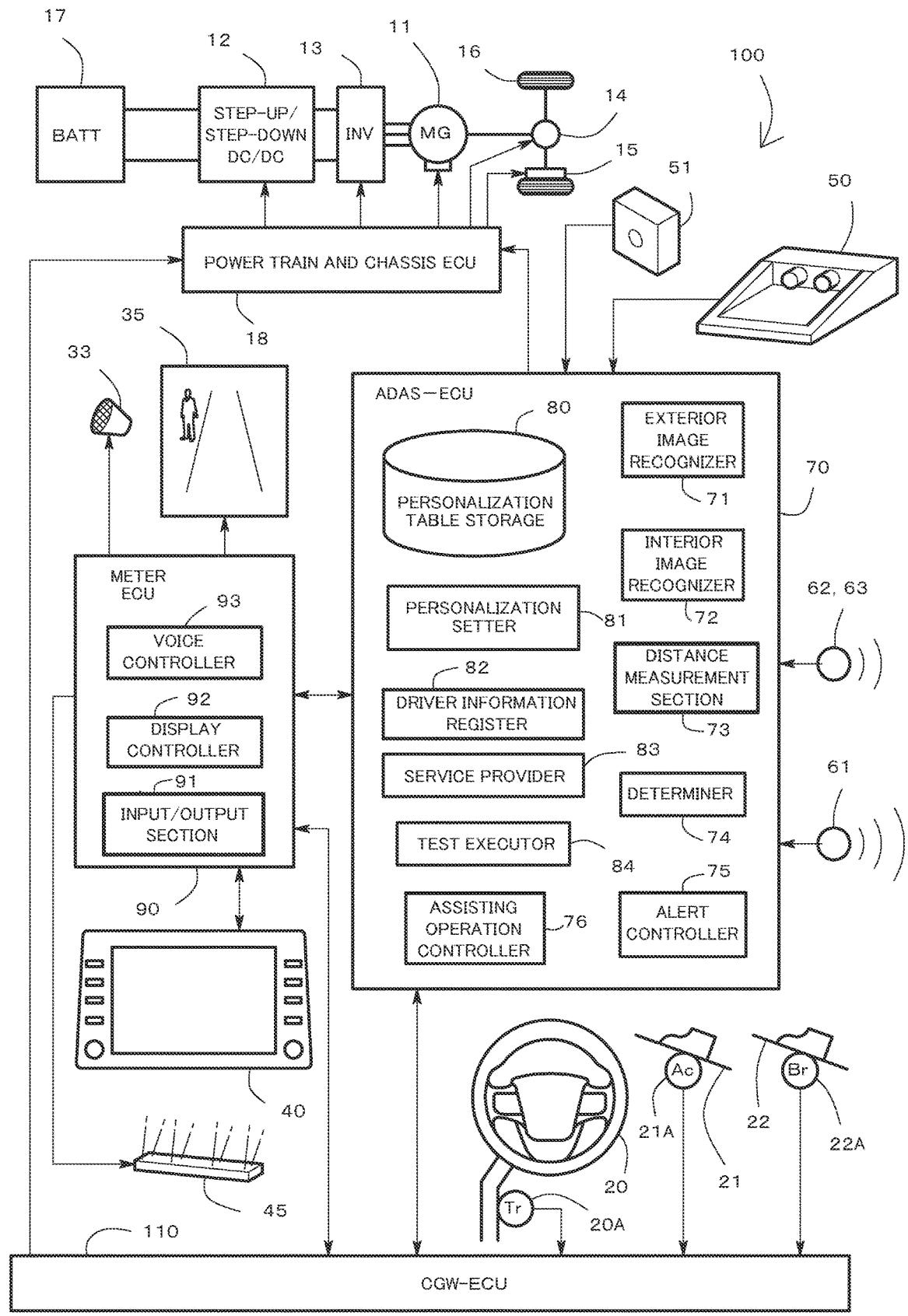
FIG. 5 illustrates functional blocks of an ADAS-ECU and a meter ECU.

The CPU executes the program stored in the memory of the meter ECU 90, providing the functional blocks in the meter ECU 90 as illustrated in FIG. 5. Specifically, the meter ECU 90 includes an input/output section 91, a display controller 92, and a voice controller 93.

The CPU of the microcomputer 70D of the ADAS-ECU 70 executes the program stored in the internal memory or the external memory 70E, providing the functional blocks in the ADAS-ECU 70 as illustrated in FIG. 5. Specifically, the ADAS-ECU 70 includes an exterior image recognizer 71, an interior image recognizer 72, a distance measurement section 73, a determiner 74, an alert controller 75, and an assisting operation controller 76. The ADAS-ECU 70 also includes a personalization table storage 80, a personalization setter 81, a driver information register 82, a service provider 83, and a test executor 84.

For both the ADAS-ECU 70 and the meter ECU 90, instead of storing the control program in the memory, the control program may be stored in a non-transitory computer-readable storage medium, such as a digital versatile disc (DVD), which is read and executed by the CPU. By such devices, various functional blocks can also be provided in each ECU as illustrated in FIG. 5.

The exterior image recognizer 71 recognizes the image area of objects outside the vehicle from the image captured by the exterior camera unit 50. For example, a convolutional neural network (CNN) capable of performing a single shot multibox detector (SSD) using supervised learning is implemented in the exterior image recognizer 71 as an image recognition algorithm. This type of image recognition allows recognition of attributes of various objects (vehicles, pedestrians, road signs, structures, and the like) included in the image captured by the exterior camera unit 50.

The distance measurement section 73 acquires image data that have already been recognized from the exterior image recognizer 71. Also, the distance measurement section 73 acquires 3D point cloud data of the distance measurement information from the lidar sensor 61. The distance measurement section 73 then combines the captured image data with the 3D point cloud data to determine how far away a certain object with a certain attribute is from the own vehicle.

The determiner 74 determines whether to execute the driving assistance functions for the alert controller 75 and the assisting operation controller 76 based on the object information (attributes and distance from the own vehicle) around the own vehicle received from the distance measurement section 73.

The interior image recognizer 72 recognizes the face of the driver from the image captured by the interior camera 51. For example, the interior image recognizer 72 recognizes the face of the driver seated in the driver's seat using the image recognition algorithm described above. Furthermore, the interior image recognizer 72 determines whether the driver whose face is recognized corresponds to any one of the registered drivers stored in the personalization table storage 80.

When the driver whose face is recognized corresponds to one of the registered drivers stored in the personalization table storage 80, the determiner 74 acquires from the personalization table storage 80 the driving assistance functions and the setting values thereof that are enabled for the corresponding registered driver. Furthermore, based on the acquired setting values of the driving assistance functions, the determiner 74 controls the execution timing of the driving assistance functions, the amount of assisting operations, and the like, with respect to the alert controller 75 and the assisting operation controller 76.

The personalization setter 81 performs personalization setting of the driving assistance functions for individual registered drivers who are drivers registered in the driver information register 82. The personalization setting includes enabling or disabling the plurality of driving assistance functions and changing the setting values of the enabled driving assistance functions. For example, the registered driver can switch the enable/disable settings of the driving assistance functions in the personalization table (see FIG. 6) and change various setting values by input operation from the center display 40.

In addition, as an input assisting function, the personalization setter 81 determines recommended setting values in changing the setting values in the personalization table and displays them on the center display 40. In determining the recommended setting values, when there is a driving assistance function (new driving assistance function) that is enabled for the first time (i.e., when there is no driving history) for the driver who is entering the settings, a driving ability test is executed on the driver by test executor 84. The personalization setter 81 determines the recommended setting values of the new driving assistance function based on the result of the driving ability test. Details of the driving ability test will be described later.

The driver information register 82 can register new drivers or change the registered information of the registered drivers stored in the personalization table storage details of which will be described later.

The service provider 83 provides additional services to the registered driver who is in the setting operation when the setting values in the personalization table are changed to the recommended setting values. The details of this provision function will be described later.

Driving Assistance Function

The ADAS-ECU 70 can perform various driving assistance functions. As mentioned above, the driving assistance functions can be broadly classified into convenience functions and safety functions.

The convenience functions reduce the burden of driving operations. Among the items in the personalization table illustrated in FIG. 6, the adaptive cruise control and the road sign assist are the convenience functions.

In the adaptive cruise control, the lidar sensor 61 and the radar sensors 62 and 63 detect the vehicle in front and automatically operate the acceleration and braking operations while maintaining a constant distance between vehicles. When there is no vehicle in front, the vehicle 100 is made to travel at a set speed.

The road sign assist is a function to minimize overlooking of road signs by the driver. The road sign assist is activated when the exterior image recognizer 71 (see FIG. 5) recognizes a road sign in the image captured by the exterior camera unit 50. For example, upon recognition of a speed limit sign and a speed limit thereon, the exterior image recognizer 71 sends the recognition result to the determiner 74. When the determiner 74 determines that the current speed of the vehicle 100 exceeds the speed limit, for example, the alert controller 75 displays an alert message on the meter display 35 via the meter ECU The alert controller 75 also causes the speakers 33 to output an alert message voice via the meter ECU 90.

The safety functions are functions to avoid or minimize vehicle accidents and reduce the scale of accidents. In the personalization table illustrated in FIG. 6, the lane tracing assist, the proactive driving assist, and the pre-crash safety are the safety functions.

In the lane tracing assist, the exterior image recognizer 71 (see FIG. 5) recognizes the lane in the image captured by the exterior camera unit 50. When the determiner 74 determines that the distance between the recognized lane and the own vehicle is less than the setting value of alert timing (see FIG. 6), the alert controller 75 causes an alert message to be displayed on the meter display 35 via the meter ECU 90. The alert controller 75 also causes the speakers 33 to output an alert message voice via the meter ECU 90.

Subsequently, when the likelihood of deviation from the lane becomes higher after the alert message is issued; that is, when the determiner 74 determines that the distance between the lane and the own vehicle is less than the setting value of the assisting timing, the assisting operation controller 76 partially assists a course correction to avoid deviation from the lane. For example, the assisting operation controller 76 operates the steering mechanism 14 via the powertrain and chassis ECU 18 to finely tune the course so that the vehicle 100 moves closer to the center of the lane.

The proactive driving is activated when the exterior image recognizer 71 (see FIG. 5) recognizes a pedestrian in the image captured by the exterior camera unit 50. For example, upon recognition of a pedestrian, the exterior image recognizer 71 sends the recognition result to the determiner 74.

When the determiner 74 determines that the distance between the vehicle 100 and the pedestrian is below the setting value of the alert timing, the alert controller 75 causes an alert message to be displayed on the meter display 35 via the meter ECU 90. The alert controller 75 also causes the speakers 33 to output an alert message voice via the meter ECU 90.

When the determiner 74 determines that the distance between the vehicle 100 and the pedestrian is at or below the setting value of the assistance timing, the assisting operation is executed. That is, the assisting operation controller 76 controls the steering mechanism 14 and the brake mechanism 15 via the powertrain and chassis ECU 18 to slightly change the course in the lane to avoid the pedestrian while decelerating the vehicle 100.

Personalization of Driving Assistance Function

Personalized settings are also called "my settings," in which, for example, the settings of the driver's seat 25 (see FIG. 1) and the volume of the guidance voice on the center display 40 can be set for each driver. The settings of the driver's seat 25 include the position of the driver's seat 25 in the front-rear direction, the height of the seat cushion, and the tilt angle of the seat back.

The my settings can be extended to include individual settings of the driving assistance functions. Therefore, data such as IDs and names of the registered drivers, for example, are shared by the seat ECU 27, the meter ECU 90, and the ADAS-ECU 70.

In the personalization of driving assistance functions, as illustrated in FIG. 6, it is possible to select enabling/disabling settings of individual driving assistance functions. In addition, for the enabled driving assistance functions, the setting values can be changed.

Referring to FIGS. 5 and 6, in setting the personalization, for example, the setting screen of the center display 40 is opened. For example, the display controller 92 of the meter ECU 90 displays an icon image for setting personalization on the center display 40. This icon image for setting may be displayed only when the vehicle is stopped.

When the driver performs a selection operation such as tapping the icon image, the driver information register 82 causes the input screen for the identification information of the driver to be displayed on the center display 40 via the display controller 92. The identification information may be, for example, an account name and password. Such identification information is stored in the personalization table storage 80.

When the driver enters the identification information, the personalization setter 81 retrieves various setting data of the vehicle linked to the identification information from the personalization table storage 80. The personalization setter 81 also displays the retrieved enable/disable settings and setting values of the various driving assistance functions on the center display 40 via the display controller 92. This allows the change of settings of the various driving assistance functions.

In setting the personalization, new registration of the driver can be carried out from the center display 40. For example, the driver information register 82 displays a new registration button image on the center display 40 via the display controller 92.

When the driver who is an input person taps the new registration button image, the driver information register 82 displays the input screen for the name, account name, and password of the driver on the center display 40 via the display controller 92.

On the other hand, the interior image recognizer 72 recognizes the face of the newly registered driver from the image captured by the interior camera 51. The driver information register 82 trims the recognized face image from the captured image and stores the image data in the personalization table storage 80 by linking the image data to the account name and the like.

When the above new registration step is completed, the personalization setter 81 displays a setting image on the center display 40 via the display controller 92, the setting image including the enable/disable settings of the functions to be personalized, which include the driving assistance functions, and the setting values thereof.

For the setting values of the functions to be personalized, the alert timing and the assisting timing can be changed, for example, in the lane tracing assist. The alert timing and the assisting timing can be set, for example, according to the distance from the own vehicle to the lane. In FIG. 6, the values of such timing are displayed in distance, so that the timing will also be referred to as "execution distance" hereinafter.

The adaptive cruise control can set the distance from the vehicle in front and, when there is no vehicle in front, can set the driving speed. The proactive driving assist can set the alert timing and the assisting timing according to the distance between the own vehicle and the pedestrian in front.

The pre-crash safety can set the alert timing and the assisting timing according to the distance between the own vehicle and the vehicle or pedestrian in front. The road sign assist can set the vehicle speed at which the road sign to be notified and the speed limit exceedance to be notified can be set.

Process Flow for Setting New Driving Assistance Function

When the registered driver stored in the personalization table storage 80 changes the personalization settings, the personalization setter 81 executes the driving ability test on the driver if there is a new driving assistance function among the enabled driving assistance functions.

The new driving assistance function refers to a driving assistance function to be enabled for the first time for the relevant registered driver during the setting process. As will be described later, the recommended setting values are determined for the registered driver through the driving ability test. Therefore, compared to the default values that are set uniformly in advance, the driving ability test can recommend more suitable setting values of the registered driver.

Figure 7:
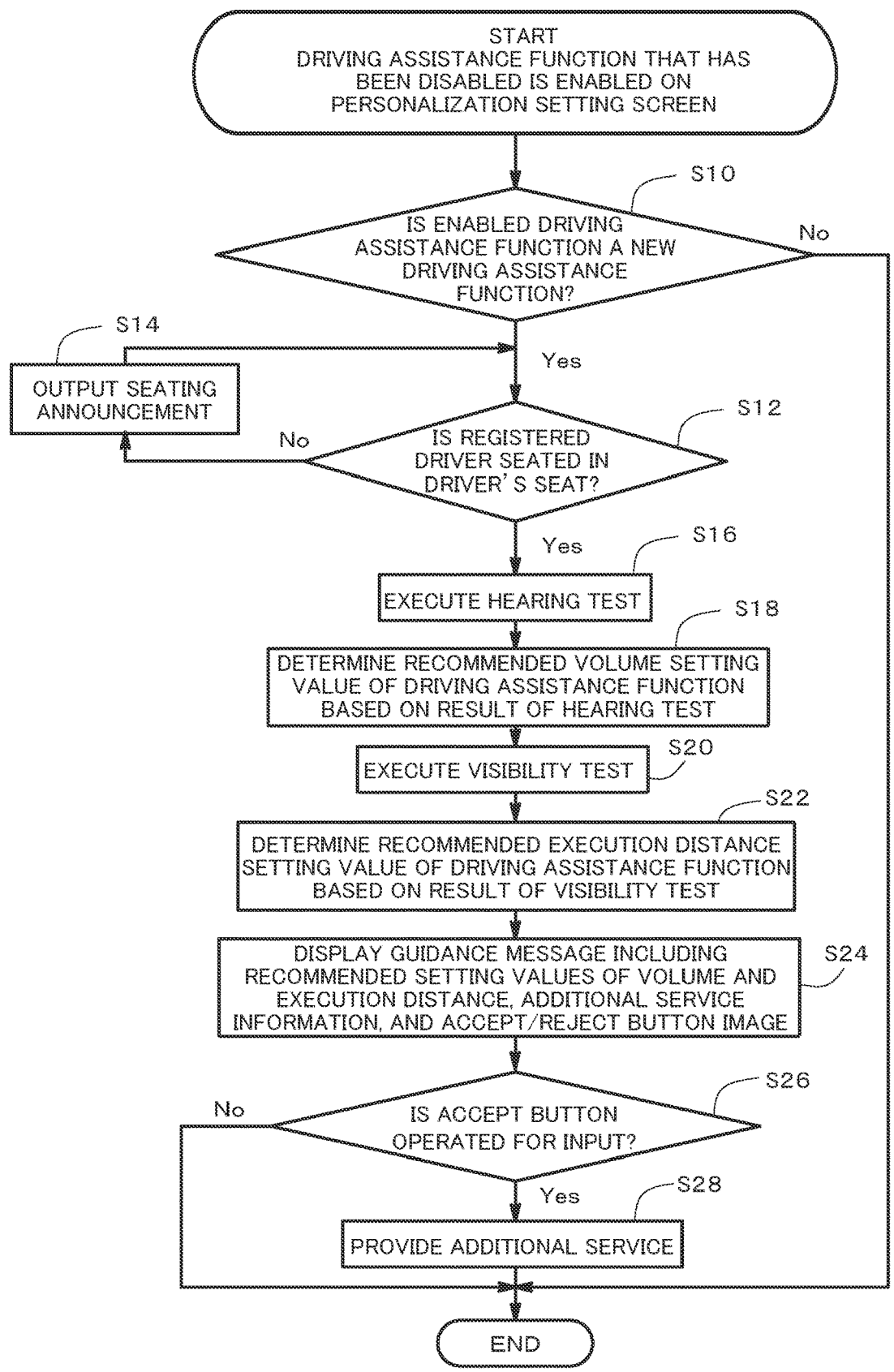
FIG. 7 is a flowchart illustrating a setting process of a new driving assistance function.

FIG. 7 illustrates a process flow for setting the new driving assistance function. This process flow is activated when the driving assistance function that has been disabled on the personalization setting screen is enabled. This process flow is also executed when a new driver is registered.

The personalization setter 81 determines whether the driving assistance function that is switched from the disabled setting to the enabled setting is a new driving assistance function (S10). For example, the personalization table storage 80 stores the number of times each driving assistance function has been enabled for each registered driver as history data. In step S10, the history data are referenced by the personalization setter 81.

If the driving assistance function switched from the disabled setting to the enabled setting is not a new driving assistance function, the process flow ends in FIG. 7. On the other hand, if the driving assistance function switched from the disabled setting to the enabled setting is a new driving assistance function, the driving ability test is executed.

The interior image recognizer 72 analyzes the image captured by the interior camera 51 to determine whether the registered driver is seated in the driver's seat (S12). For example, the interior image recognizer 72 recognizes an image area of the driver's seat from the image captured by the interior camera 51. The interior image recognizer 72 also determines whether a person is seated in the image area of the driver's seat. In addition, the interior image recognizer 72 determines whether the person seated in the driver's seat is the same person as the registered driver whose personalization is to be changed. In this determination, the face image of the registered driver stored in the personalization table storage 80 is used.

If the registered driver is not seated in the driver's seat, the test executor 84 outputs a seating guidance announcement via the voice controller 93 or via the display controller 92 (S14). For example, a text is displayed on the center display 40 to urge the driver to seat the driver in the driver's seat. Alternatively, an announcement voice urging the driver to sit in the driver's seat is output from the speakers 33. After the announcement is output, the process flow returns to step S12.

When the registered driver is seated in the driver's seat in step S12, the test executor 84 executes a hearing test (S16). The details of the hearing test will be described later, but in the hearing test, for example, the ability to hear the sample voice is tested by frequency.

After the hearing test is executed, the personalization setter 81 determines the recommended setting value of the volume of the driving assistance function based on the test (S18). For example, the volume at which the registered driver hears a sample sound of the alert sound which is specified for each driving assistance function is set to the recommended setting value.

The test executor 84 also executes a visibility test for the registered driver (S20). The details of the visibility test will be described later, but, for example, elapsed time (reaction time) from the point of projection of the vehicle image 120 in FIG. 8 or the person image 125 in FIG. 9 to the point of noticing such image is measured.

After the visibility test is executed, the personalization setter 81 determines the recommended setting value of the distance between the own vehicle and the object (execution distance), which is the setting value of the new driving assistance function, based on the test (S22). Referring to FIG. 6, the personalization setting can set an alert execution distance (alert timing), which is a distance between the own vehicle and the object used as a standard distance for outputting alerts, and an assisting execution distance (assisting timing), which is a distance between the own vehicle and the object used as a standard distance for executing assisting operations. The recommended setting values of such execution distances are determined based on the result of the visibility test.

Qualitatively, the slower the reaction time, the farther the value of the execution distance is set. In other words, the alerts and assisting operations are executed from the point in time when the object is still located far away.

When the recommended setting values of the volume and execution distance are determined, the personalization setter 81 outputs, via the display controller 92, a guidance message including the relevant recommended setting values, information on the additional service, and a request to accept or reject the recommended setting values (S24). For example, the guidance message text is displayed on the center display 40 along with the display of an accept/reject button image on the center display 40.

When the registered driver operates and inputs the accept button (button image such as "YES"), the personalization setter 81 sets the various setting values of the new driving assistance function to the recommended setting values. This allows setting of the setting values that are more suitable for the registered driver from the beginning of use of the new driving assistance function, as compared with the default values that have been set in advance for the new driving assistance function.

The driving ability test is executed when the registered driver is seated in the driver's seat 25 of the vehicle 100 to which the driving assistance function is actually applied. In other words, the effective viewing angle of the registered driver when seated in the driver's seat 25 and looking forward, for example, can be detected based on the driving ability test. Therefore, as compared with the case where the driving ability test is executed using a simulator, a smart phone, or the like, the recommended setting values can be proposed with higher accuracy.

The service provider 83 provides the additional service to the registered driver when the accept button is operated and input in step S26, or when the input operation is performed to agree to the setting of the recommended setting values (S28). When the reject button is operated and input in step S26, the additional service is not provided and the process flow ends. The additional service may be a service such as one that allows the registered driver to experience the new driving assistance function for free for a certain period of time.

The personalization setting according to the recommended values can provide the driving assistance functions suitable for the registered drivers. The execution of the optimal driving assistance functions for the registered driver reduces the accident and failure rate of the vehicle 100. This improves reliability of the vehicle 100, while providing benefits over the cost of providing the additional services for the vehicle manufacturer or the like which provides the additional services.

Driving Ability Test

As mentioned above, the driving ability test includes the hearing test and the visibility test. For example, the alert sounds for the driving assistance functions may have different frequencies for different functions. In order to identify whether there are frequencies that are difficult for the registered drivers to hear, the test executor 84 causes sample sounds of various frequencies to be output from the speakers 33 via the voice controller 93 as the hearing test.

In conjunction with the output of the sample sounds, the test executor 84 causes the center display 40 to show, via the display controller 92, an input operation button image and a guidance message requesting the registered driver to perform the input operation (e.g., tapping) when the sample volume is heard.

The sample sound may be gradually increased in volume from a predetermined initial volume. The test executor 84 records the volume at the time of the input operation. Subsequently, the test executor 84 causes the sample voice to be output from the speakers 33 at a different frequency. In this way, the volume for the recommended setting is determined for each frequency.

Figure 8:
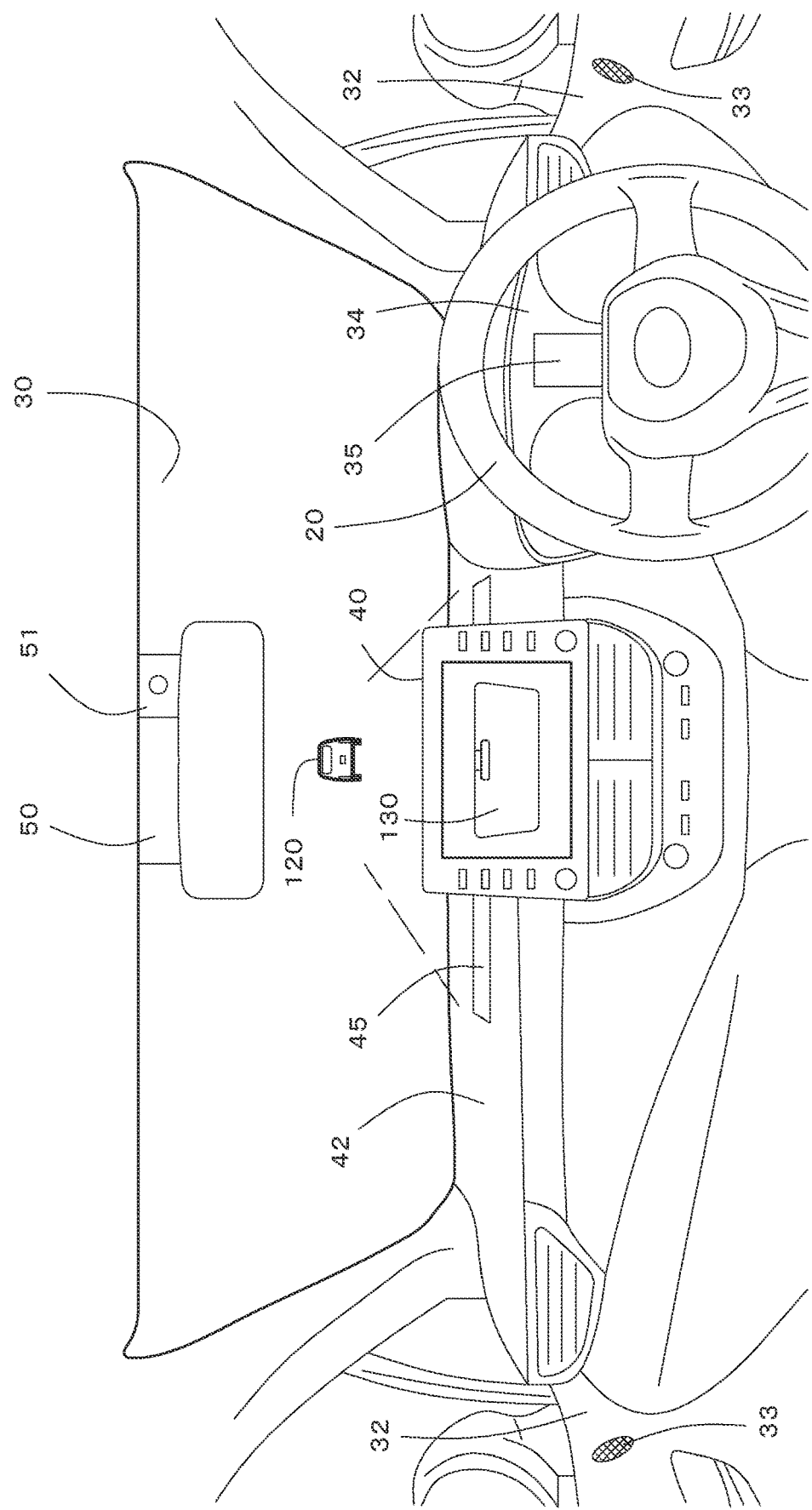
FIG. 8 illustrates a driving ability test for a new driving assistance function which is a vehicle avoidance function.
Figure 9:
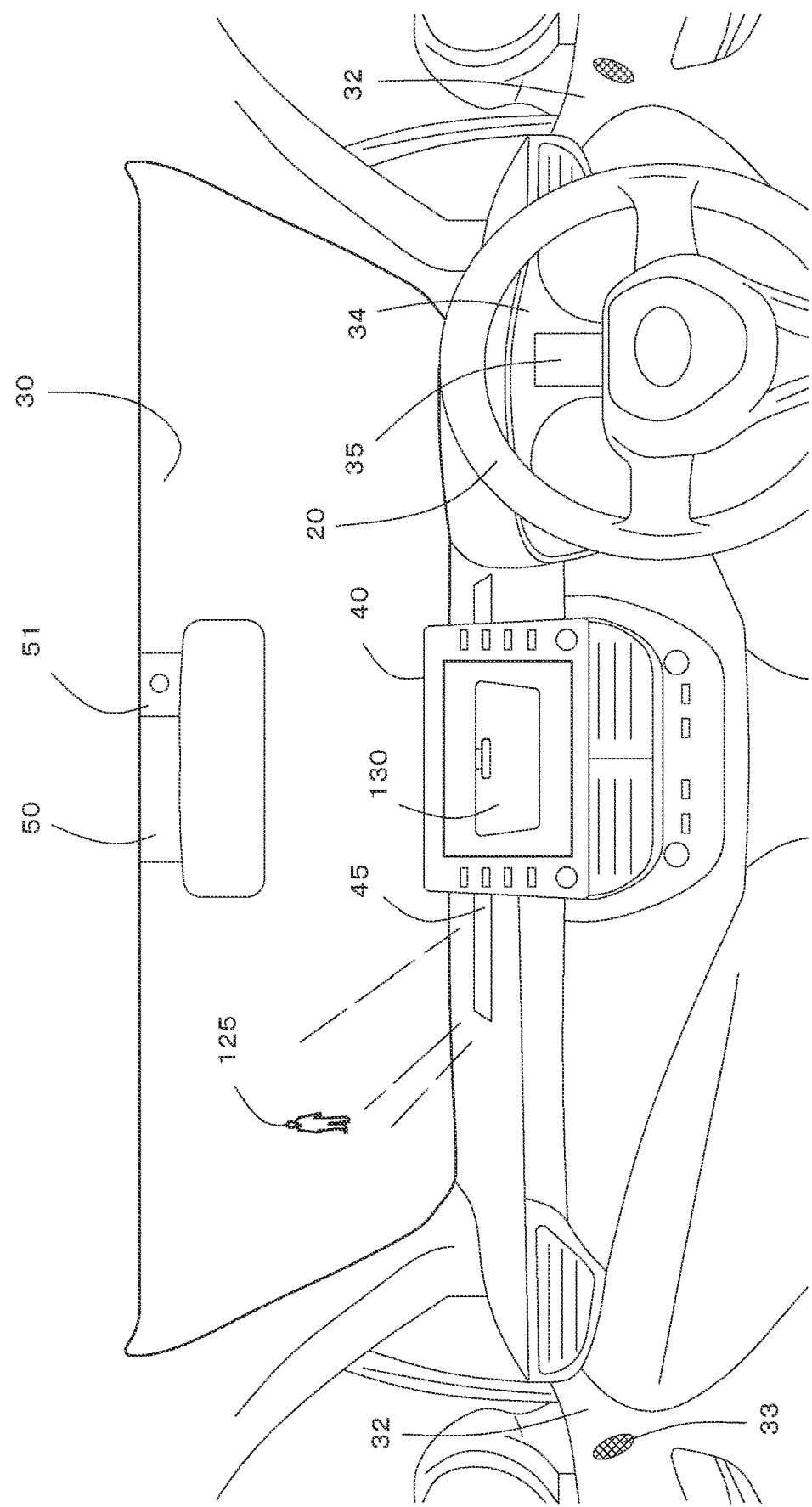
FIG. 9 illustrates a driving ability test for a new driving assistance function which is a pedestrian avoidance function.

FIGS. 8 and 9 illustrate examples of the visibility test. In the visibility test, the reaction speed to other vehicles and pedestrians outside the vehicle 100 is tested.

FIG. 8 illustrates an example of the visibility test for a vehicle avoidance driving assistance function. The vehicle avoidance driving assistance function corresponds to, for example, the adaptive cruise control and the pre-crash safety among the driving assistance functions listed in FIG. 6.

Referring to FIGS. 5 and 8, the test executor 84 causes the vehicle image 120 to be projected from the HUD projector 45 onto the windshield glass 30 via the display controller 92. Assuming actual driving conditions, the vehicle image 120 is projected at the center of the windshield glass 30 in the vehicle width direction.

In conjunction with the projection of the vehicle image 120, the test executor 84 displays, on the center display 40, via the display controller 92, an input operation image 130 and a guidance message requesting the registered driver to perform the input operation (e.g., tapping) when the vehicle image 120 is visible.

The image of the windshield glass 30 may be displayed on the center display 40 as the input operation image 130. The test executor 84 may also require, as the input operation, the registered driver to indicate on the input operation image 130 at which position of the windshield glass 30 the vehicle image 120 is projected.

The test executor 84 records elapsed time taken from the point of projection of the vehicle image 120 to the point of input operation on the input operation button image as the reaction time. By executing such a visibility test, the reaction time to the vehicle in front can be tested when the registered driver is actually seated in the driver's seat 25.

FIG. 9 illustrates an example of the visibility test for the pedestrian avoidance driving assistance function. The pedestrian avoidance driving assistance function corresponds to, for example, the proactive driving assist and the pre-crash safety among the driving assistance functions listed in FIG. 6.

Referring to FIGS. 5 and 9, the test executor 84 causes the HUD projector 45 to project the person image 125 onto the windshield glass 30 via the display controller 92. Assuming actual driving conditions, the person image 125 is projected onto the side portion of the windshield glass 30 in the vehicle width direction.

In conjunction with the projection of the person image 125, the test executor 84 causes the center display 40 to display, via the display controller 92, the input operation image 130 and a guidance message requesting the registered driver to perform the input operation (e.g., tapping) when the person image 125 is visible. The image of the windshield glass 30 may be displayed on the center display 40 as the input operation image 130. The test executor 84 may also require the registered driver, as the input operation, to indicate on the input operation image 130 at which position of the windshield glass 30 the vehicle image 120 is projected.

The test executor 84 records elapsed time taken from the point of projection of the person image 125 to the point of input operation on the input operation button image as the reaction time. By executing such a visibility test, the reaction time to the pedestrian can be tested when the registered driver is actually seated in the driver's seat 25.

In this way, the visibility test is executed with the registered driver seated in the driver's seat 25 of the vehicle 100 to which the driving assistance function is actually applied. In other words, the effective viewing angle (visibility) of the registered driver when seated in the driver's seat 25 can be detected based on the visibility test. For example, the effective viewing angle of the actual vehicle in rainy weather or at night, when the effective viewing angle is known to be relatively narrow, can be detected based on the visibility test.

In the visibility test, the test executor 84 may also execute an effective viewing angle test. For example, the test executor 84 outputs an announcement asking the registered driver to look forward from the speakers 33 via the voice controller 93. The test executor 84 also causes the HUD projector 45 to project a test image onto the windshield glass 30 via the display controller 92. This test image is, for example, a moving projection of the person image 125 from the side edge of the windshield glass 30 in the vehicle width direction toward the center. When the registered driver, who is an examinee, visibly recognizes the person image 125, the driver performs the input operation (e.g., tapping) on the center display 40.

In this case, the personalization setter 81 sets the execution distance in the pedestrian avoidance function to a farther value as the effective viewing angle becomes narrower. The execution distance is also set to a farther value in a so-called front cross traffic alert which detects vehicles crossing in front of the vehicle 100.

The present disclosure is not limited to the present embodiments described above, and includes all changes and modifications without departing from the present disclosure is not limited to the present embodiments described above, and includes all changes and modifications without departing from the technical scope or the essence of the present disclosure defined by the claims.

The invention claimed is:

1. A vehicle driving assistance system, comprising:
an electronic control unit capable of registering driver information;
the electronic control unit capable of changing enable/disable setting of a plurality of driving assistance functions and changing setting values of each of the plurality of driving assistance functions for registered drivers who are registered in the electronic control unit; and
the electronic control unit that executes a driving ability test according to a new driving assistance function for a specific registered driver when there is the new driving assistance function which is a driving assistance function enabled for the first time for the relevant registered driver among the plurality of driving assistance functions to be enabled for the registered drivers,
wherein the electronic control unit determines recommended setting values of the new driving assistance function based on a result of the driving ability test, without basing on a driving history of the registered driver.

2. The vehicle driving assistance system according to claim 1, wherein
the electronic control unit outputs a guidance message to the registered driver requesting whether to accept or reject setting of the recommended setting values,
the vehicle driving assistance system further comprising:
a service provider that provides an additional service when an input operation is performed to agree setting of the recommended setting values.

3. The vehicle driving assistance system according to claim 1, further comprising:
a projector capable of projecting an image onto a windshield glass of a vehicle; and
an input device that receives an input operation from the registered driver, wherein
the new driving assistance function is a pedestrian avoidance function, the electronic control unit is configured to perform, as a driving ability test, projecting a person image from the projector to a side portion of the windshield glass and outputting a message requesting the input operation to the input device when the person image is recognized, and determining the recommended setting values of the new driving assistance function based on elapsed time from the time when the person image is projected to the time when the input operation to the input device is performed.

4. The vehicle driving assistance system according to claim 1, further comprising:

a projector capable of projecting an image onto a windshield glass of the vehicle; and an input device that receives an input operation from the registered driver, wherein the new driving assistance function is a vehicle avoidance function, the electronic control unit is configured to perform, as a driving ability test, projecting a vehicle image from the projector to a center portion of the windshield glass and outputting a message requesting the input operation to the input device when the vehicle image is recognized, and determining the recommended setting values of the new driving assistance function based on elapsed time from the time when the vehicle image is projected to the time when the input operation to the input device is performed.

* * * * *